United States Patent [19]

Wakeman

[11] E Re. 30,878

[45] Reissued Mar. 9, 1982

[54] COPYING APPARATUS COVER

[75] Inventor: William G. Wakeman, San Jose, Calif.

[73] Assignee: Pitney Bowes Inc., Stamford, Conn.

[21] Appl. No.: 251,574

[22] Filed: Apr. 6, 1981

Related U.S. Patent Documents

Reissue of:

[64] Patent No.: 4,150,896
Issued: Apr. 24, 1979
Appl. No.: 868,094
Filed: Jan. 3, 1978

[51] Int. Cl.[3] ..... G03B 27/62
[52] U.S. Cl. ..... 355/75
[58] Field of Search ..... 355/75, 74, 76, 25

[56] References Cited

U.S. PATENT DOCUMENTS

| | | | |
|---|---|---|---|
| 2,653,509 | 9/1953 | Nineberg | 355/76 |
| 3,717,411 | 2/1973 | Niesen et al. | 355/75 |
| 3,724,949 | 4/1973 | Kanno et al. | 355/75 |
| 4,053,223 | 10/1977 | Nebiker et al. | 355/75 |
| 4,124,296 | 11/1978 | Kishi et al. | 355/75 |

*Primary Examiner*—Donald A. Griffin
*Attorney, Agent, or Firm*—Lawrence E. Sklar; William D. Soltow, Jr.; Albert W. Scribner

[57] ABSTRACT

In an electrophotographic copying apparatus, a cover and document keep device comprises a rigid cover member for securely holding original documents during copying and for effectively shielding the user from exposure to ultraviolet or visible radiation. A support member incorporating a plurality of positioning rods is vertically slidingly engaged within holes formed in the copying apparatus housing. An L-shaped frame is hinged by a first hinging means to the vertically movable support member, and carries the rigid cover by an additional second hinging means. Fastening means are provided to allow only one of the hinging means to be operated at one time, thereby allowing the rigid cover member to be pivoted about either axis defined by the hinging means. Accommodation of various original document thicknesses is provided by vertical sliding movement of the support member.

14 Claims, 6 Drawing Figures

COPYING APPARATUS COVER

Matter enclosed in heavy brackets [ ] appears in the original patent but forms no part of this reissue specification; matter printed in italics indicates the additions made by reissue.

Recent developments in electrophotographic copiers and duplicators have both increased the speed and improved the quality of copies made from a given original. Copiers have also been manufactured which will reproduce copies with the same colors as the original. One of the engineering methods used to accomplish these improvements has been to increase the intensity of the photographic light source, and in particular the intensity of the ultra-violet radiation emitted by the light source. It is, therefore, important to provide adequate protection for the user's eye in order to avoid the possibility of harmful effects resulting from high levels of ultra-violet radiation. As the eye can be easily damaged by high levels of ultra-violet or visible radiation, it is particularly important to provide an adequate copier platen cover which is effective in shielding the user from the major part of radiation emitted by the copier's light source. Significant aspects of photographic copier construction and hazardous radiation shielding are discussed in U.S. Pat. No. 4,053,223, Nebiker et al.

In addition to being used as a radiation-shield device, copier platen covers also function as a means for keeping the original document in place during the copying cycle. It is, therefore, important to provide a copier platen cover which will accommodate various thicknesses of originals ranging from a single sheet to a thick book.

In order to accommodate various original thicknesses, platen covers are often manufactured of a pliable material which flexes to conform to whatever thickness of original is being copied. For large-original copiers, this type cover often becomes very heavy and cumbersome to use since its flexible nature makes the use of auxiliary cover raising and lowering means complicated and difficult to implement. Rigid platen covers, on the other hand, often include counterbalancing springs or other means which greatly aid the user in raising or lowering the cover. Covers of this type are usually installed to be hinged along a single axis only, however, and when a thick original, such as a book, is to be copied, the cover cannot be completely closed and a portion of the platen is exposed, allowing visible and ultra-violet radiation to impinge upon the user. A method is needed to allow platen covers to be manufactured that would both be relatively easy to use and would also provide an effective shield against radiation regardless of the thickness of the original document.

The following prior patents are thought to be pertinent: Menon et al issued 1976, U.S. Pat. No. 3,997,265; Goshima et al issued 1976, U.S. Pat. No. 3,994,582; Kanno et al issued 1973, U.S. Pat. No. 3,724,949.

Menon utilizes a large exterior cover which acts as a radiation shield with an interior structure comprising an original document holder attached to a plurality of pivoting, sliding, linking members which allows the original document holder to remain parallel with the platen face regardless of the thickness of the original document. This presents a mechanically complicated device which is both time consuming and costly to build. Goshima describes the use of a flexible platen cover attached to a complicated system of springs and linking members which aid in the raising and lowering of the platen cover. This invention necessitates a good deal of mechanical construction. Kanno illustrates the use of a rigid platen cover which remains parallel to the platen face while moving vertically to accommodate the desired original document. The platen cover is attached to two vertical posts which extend perpendicularly from the plane of the platen out of the copier body. The platen cover is raised and lowered through an intricate series of gears and motors which operate by way of an electromechanical document thickness sensing means. The machinery of this invention is both costly and difficult to build.

It is therefore an object of the present invention to provide an easily operable platen cover which provides an effective radiation shield regardless of original document thickness.

It is a further object of this invention to provide an easily operable and effective platen cover which is both easy to construct and economical to build.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention provides a low cost, easily operable rigid platen cover which is also very effective as a shield against visible or ultra-violet radiation. The rigid cover can also be used as an additional work surface. The present invention utilizes a dually-hinged rigid platen cover with the pivoting hinge axes disposed along the left and rear edges of the platen cover at right angles to each other. The rear pivoting hinge axis allows the platen cover to be pivoted away from the platen face in order to accommodate single sheets or very thin originals. The left hinged pivoting axis is mounted to a support member which incorporates a plurality of depending positioning rods which extend telescopingly into holes formed in the top portion of the copier. The positioning rods are slidingly engaged within the holes, which allows the entire pivoting axis to be moved vertically thereby raising or lowering the entire platen cover to accommodate an original of any thickness. The platen cover therefore remains substantially parallel to the platen face regardless of any original thickness and acts to effectively shield the user's eyes from any visible or ultra-violet radiation. Use of the left pivoting hinge axis also allows easier placement of oversize documents on the platen surface. Fastening means are also provided which allow independent pivotal movement about either selected hinge axis and eliminates any undesired pivotal movement about the unselected hinge axis.

An analogous situation is the dual-action tailgate, marketed by Ford Motor Company about 1965, which was designed to be opened either as a conventional station wagon tailgate or as a door, by utilizing a universal-type hinge and a system of interlocks to allow the tailgate to be opened in only one manner at any particular time.

The present invention, however, uses two distinct hinge systems in conjunction with easily attachable and detachable fasteners to allow the copier cover to be opened along only one hinging axis at one time. This constitutes a much simpler and more easily constructed structure than that provided in the dual-action tailgate.

For a fuller understanding of the nature and objects of the invention, reference should be had to the following detailed description taken in connection with the accompanying drawings, in which:

THE DRAWINGS

DETAILED DESCRIPTION

Figure 1:
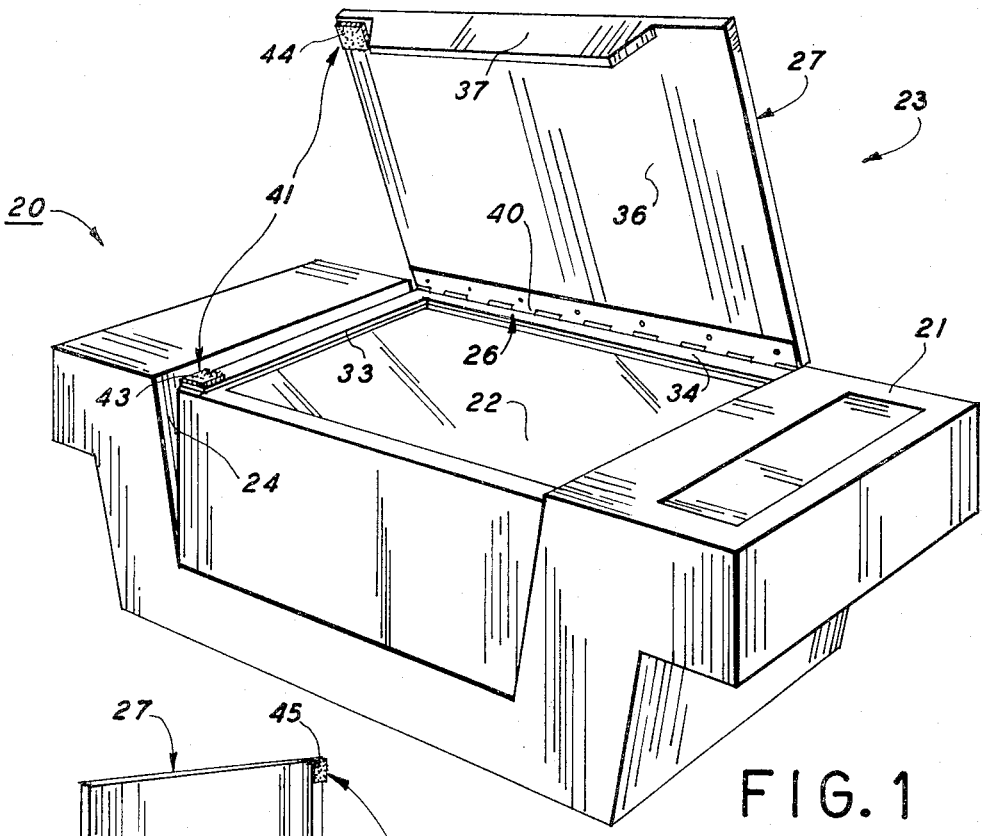
FIG. 1 is a right front perspective view of an electrophotographic copying apparatus, illustrating one mode of cover operation.
Figure 2:
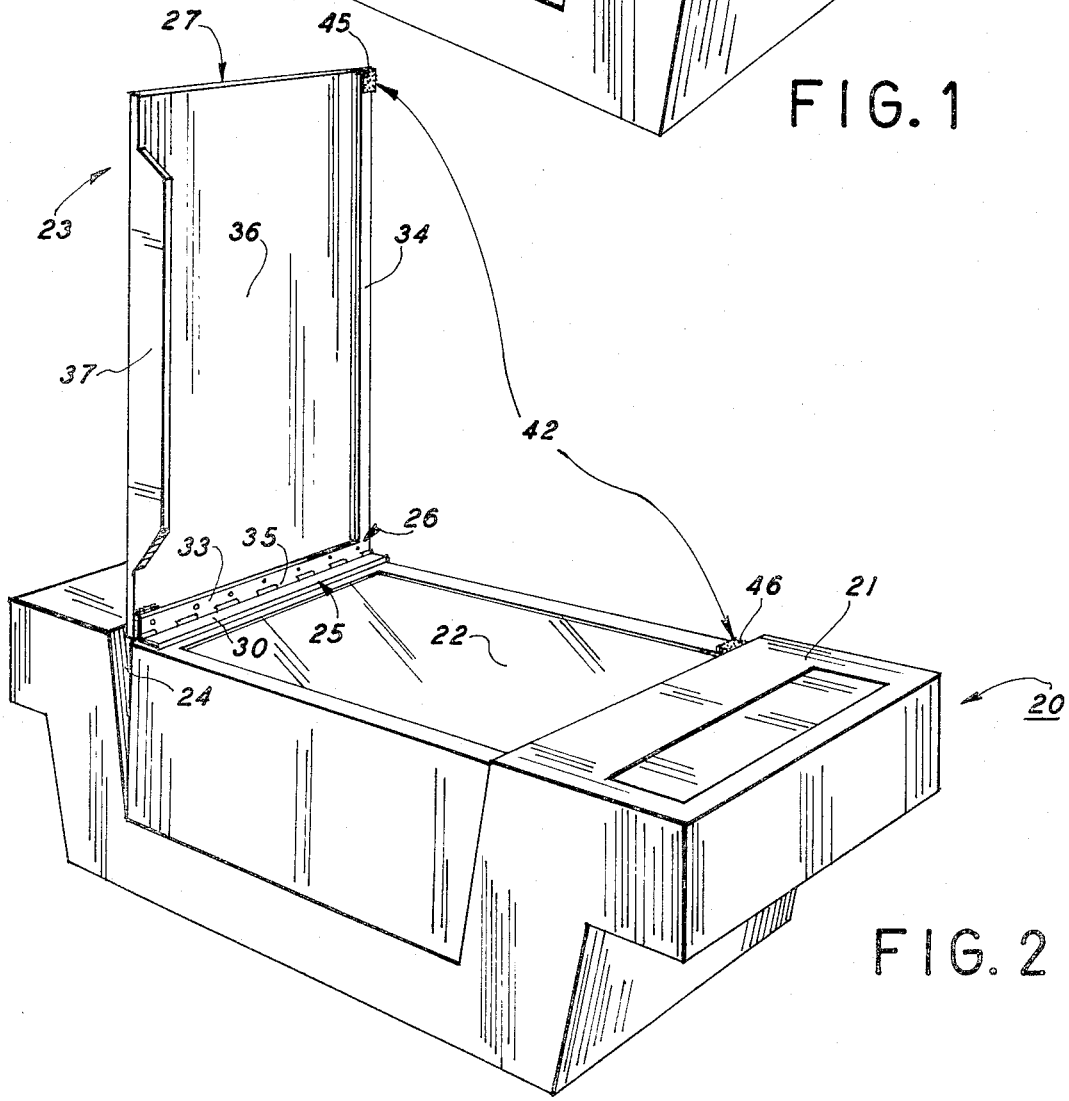
FIG. 2 is a similar perspective view of the electrophotographic copying apparatus shown in FIG. 1, illustrating an alternate mode of cover operation.

Referring to FIGS. 1 and 2, there is shown an electrophotographic copying apparatus 20 comprising a housing structure 21, a copying platen surface 22 and a document keep device 23. The housing structure 21 provides an enclosure for the electrical and mechanical components of the copying apparatus 20 and is designed to be esthetically pleasing as well as functional.

The platen surface 22 comprises a sheet of transparent material, such as glass, and is disposed within a recessed portion 24 of the housing structure 21. The platen surface 22 receives documents to be copied and its optically transparent nature allows printed information to be exposed through the platen surface 22 to image recording devices disposed within the copier housing 21.

Figure 5:
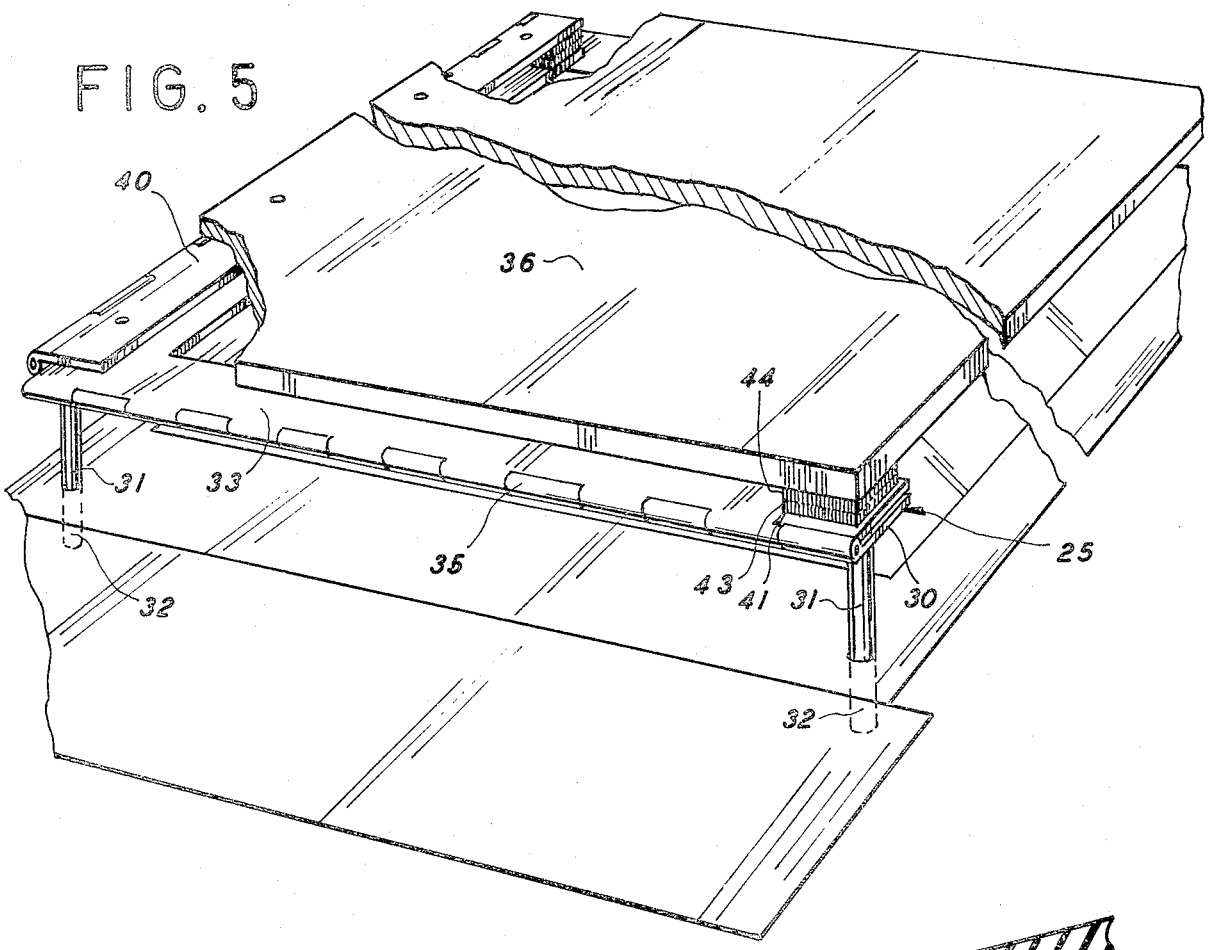
FIG. 5 is a fragmentary, enlarged, left end perspective view of the electrophotographic copying apparatus shown in FIG. 1, with parts broken away, showing further details of its construction.

The document keep device 23 comprises a support member 25, an L-shaped cover frame 26, and a rigid cover 27. The support member 25 comprises a flat, elongated, rectangular plate or support arm 30 incorporating at least two depending positioning rods 31. The support member 25 can be seen more clearly by referring to FIGS. 5 and 6.

The positioning rods 31 are formed as a portion of the support arm 30 and extend downwardly from the arm 30. Positioning holes 32 are formed in the housing structure 21 of the copying apparatus 20 adjacent to the platen surface 22. The positioning holes 32 preferably form loose vertical sleeve bearings and slidingly receive the telescoping positioning rods 31 for vertical sliding engagement.

Figure 4:
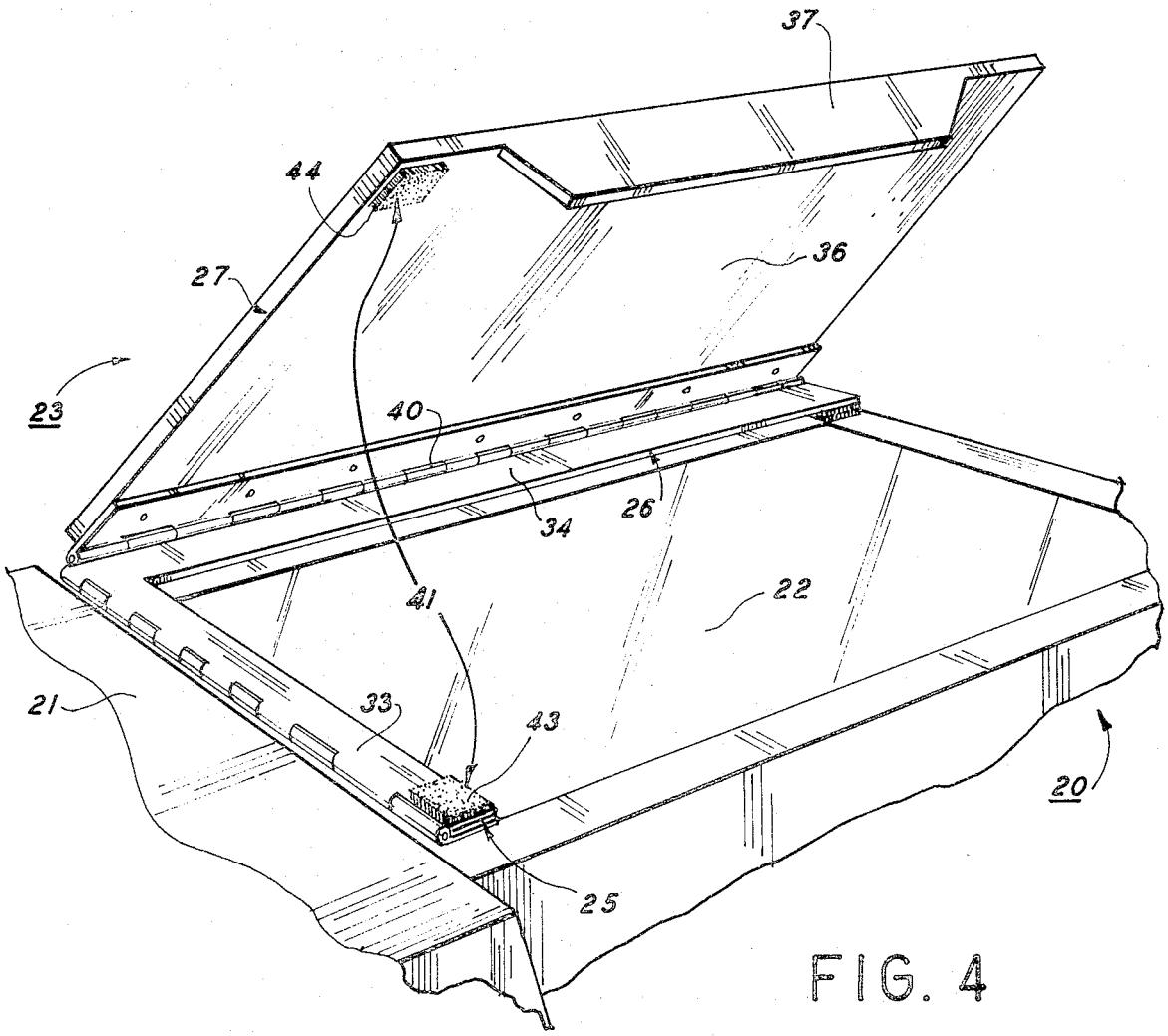
FIG. 4 is an enlarged fragmentary left front corner perspective view of the electrophotographic copying apparatus shown in FIG. 1, with parts broken away, showing details of its construction.

The L-shaped cover frame 26, seen more clearly in FIG. 4, is of unitary construction and is comprised of elongated rectangular arms 33 and 34 disposed at right angles to one another to form the L-shaped member 26. The left arm 33 of the L-shaped cover frame 26 is disposed adjacent to and longitudinally pivotally mounted to the arm 30 of the support member 25 by action of a left hinging means 35. The L-shaped cover frame 26 is disposed about two perimeter edges of the copying platen surface 22, the left edge and the rear edge as viewed by the user.

The cover 27 comprises a rigid rectangular member 36 incorporating a downwardly extending lip portion 37 which acts as a handle in aiding the raising and lowering of the cover 27. The cover 27 is disposed over the platen surface 22 and is pivotally mounted to the elongated arm 34 of the L-shaped cover frame 26 by action of a rear hinging means 40. The cover 27 can also be used as a work surface along with the top surface of the housing 21.

Hook and loop type fasteners 41 and 42 currently sold under the trademark "VELCRO" (Trademark held by Velcro, Inc. Registration No. 1,027,417, INT. CL. 26) are provided to make certain that only one of the hinging means 35 and 40 is operated at any one particular time. Small magnets or other releasable holding devices could also be used. The hook and loop type fastener 41 comprises a lower pad 43 and an upper pad 44. The lower pad 43 is mounted to the top surface of the arm 33 of the L-shaped cover frame 26 at the end distant from the right angle junction of the unitary arms 33 and 34. The top pad 44 of the hook and loop type fastener 41 is mounted to a corner of the underside of the rectangular cover member 36 in such position that it is pivotally contactable with the lower pad 43 of the fastener 41.

The hook and loop type fastener 42 comprises an upper pad 45 and a lower pad 46. The upper pad 45 is mounted to the underside of the elongated arm 34 of the L-shaped cover frame 26 at the end distant from the right angle formed by the unitary arms 33 and 34. The lower pad 46 is mounted to the top surface of the housing structure 21 adjacent to the platen surface 22 in such a position that it is pivotally contactable with the upper pad 45 mounted on the elongated arm 34.

When copying single sheets or very thin originals, the copying apparatus 20 is operated in its first mode in the following manner. The copier cover 27 is pivoted away from the platen surface 22 by grasping the lip portion 37 of the cover 27 and exerting an upward pressure. This releases the fastener 41 and causes the cover 27 to pivot about the axis defined by the rear hinging means 40. The hook and loop fastener 42 holds the elongated arm 34 securely to the top surface of a copier housing 21, thus allowing the cover 27 to be freely raised and lowered by action of the rear hinging means 40. When an original document is placed on the platen surface 22, the cover 27 may be lowered to keep the document in place during the copying cycle and also to shield the user during copier operation from any ultraviolet or visible radiation generated by the light source disposed within the housing structure 21.

Figure 6:
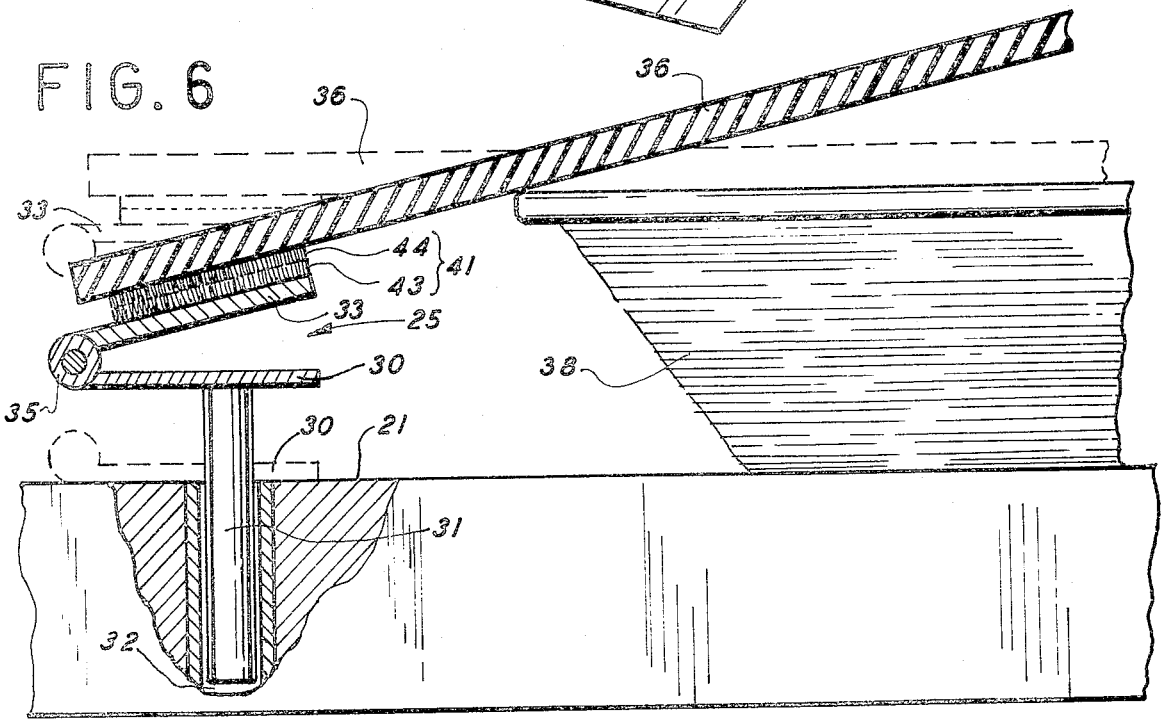
FIG. 6 is a greatly enlarged, fragmentary, cross sectional front elevational view of the electrophotographic copying apparatus shown in FIG. 1, illustrating an intermediate stage of the alternate mode of operation, with the initial and final stages indicated in phantom.

When a thick original, such as a book 38, is to be copied, the second mode of operation of the cover 27 is somewhat different. Referring to FIGS. 2 and 6, this alternate mode of operation will now be described. By grasping the right edge of the rectangular cover member 36 of the cover 27 and exerting an upward pressure while pressing downward above fastener 41, the hook and loop type fastener 42 is released, allowing the cover 27 to pivot away from the platen surface 22 about the axis defined by the hinging means 35. The hook and loop type fastener 41 secures the left edge of the rectangular cover member 36 to the elongated arm 33 of the L-shaped cover frame 26, thereby allowing the cover 27 to be freely pivoted about the axis defined by the left hinging means 35. This mode of operation can be utilized for copying large or oversize documents, as easier placement for large documents is afforded in the second mode.

When a thick original is placed on the platen surface 22, and the cover 27 is pivotally lowered to contact it, the pivoting lowering movement of the cover 27 will be retarded with the cover 27 maintaining an acute angle with the platen surface 22, due to the thickness of book 38. Such positioning of the cover 27 with relation to the platen surface 22 is undesirable as it would expose the user to radiation from the partially uncovered platen surface. The present invention allows the cover 27 to remain in parallel alignment with the platen surface 22, providing maximum coverage of the platen surface 22 and maximum protection to the user. It operates in the following manner.

With the cover 27 in contact with the near edge of book 38 at an angle to the platen surface 22, the user exerts a downward pressure on the right side of the cover 27, or permits the cover to continue its rocking descent, impelled by gravity. The cover 27 then moves in a levered, rocking, "see-saw" manner, with the edge of book 38 acting as a fulcrum, acting like the beam of a walking-beam engine.

The levered rocking descent of the cover 27 raises the cover's left edge, as seen in FIG. 6, drawing the positioning rods 31 out of the positioning holes 32. In FIG. 6, the support member 25 and positioning rods 31 are shown partially telescoped in the positioning holes 32, with the cover 27 in rocking contact with the book 38. The initial stage of the cover operation with the support member in contact with the copying apparatus housing 21 is shown in phantom in FIG. 6, as is the final stage of the cover operation with the cover 27 shown parallel to platen surface 22, with rods 31 withdrawn from holes 32 to the full extent required.

The support member 25 is able to move vertically by way of the sliding engagement of the positioning rods 31 within the positioning holes 32 in the housing structure 21, thereby allowing the cover 27 to remain parallel with the platen surface 22 regardless of the thickness of the original to be copied.

Figure 3:
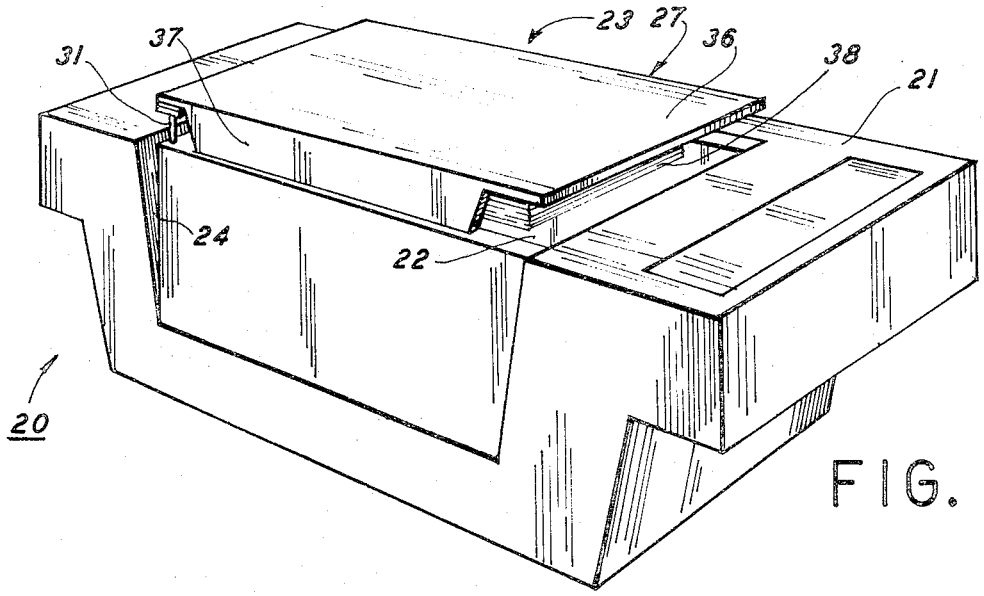
FIG. 3 is a similar perspective view of the electrophotographic copying apparatus shown in FIG. 1, illustrating a further stage of the alternate mode of cover operation.

Maintaining parallel alignment of the cover 27 and the platen surface 22 provides uniform pressure to the document to be copied resulting in effective holding of the document during the copying cycle. This parallel alignment also provides maximum protection to the user against any ultraviolet or visible radiation generated by the copying apparatus. FIG. 3 illustrates the copier cover 27 being used to accommodate a thick original. The parallel alignment of the cover 27 with the platen surface 22 can be clearly seen, with rods 31 partially withdrawn from holes 32.

The copying apparatus 20, therefore, easily permits the copying of original documents of varying thicknesses without increasing the complexity or difficulty of operation of the cover assembly. The operation of the rear hinge means 40 allows thin originals to be copied easily. The left hinge means 35 and the sliding mobility of the positioning rods 31 within positioning holes 32 provide quick adaptibility to thick originals. Maximum user protection from radiation is always provided, notwithstanding the original document thickness.

It will thus be seen that the objects set forth above among those made apparent from the preceding description are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

I claim:

1. A cover and original document keep device for copying apparatus having a housing and platen surface comprising:

(A) a vertically movable support structure having an elongated support member incorporating a plurality of positioning rods extending downwardly therefrom, (B) means forming positioning holes in the copying apparatus housing, the positioning rods being slidingly engaged within the positioning holes thereby providing vertical sliding mobility to the support structure;

(C) an L-shaped cover frame comprising two elongated arms, one arm being longitudinally pivotally mounted by a first hinge means to the support structure, the other arm extending outwardly at an angle therefrom;

(D) a rigid cover pivotally mounted by a second hinge means to the outwardly extending arm of the L-shaped cover frame; and (E) holding means for independently and releasably securing the rigid cover to the longitudinally pivotally mounted arm of the L-shaped cover frame and alternatively releasably securing the outwardly extending arm of the L-shaped cover frame to the copying apparatus surface, comprising easily attachable and detachable fasteners, thereby allowing selection of pivotal operation about either pivotal axis of the first hinge means or the second hinge means and eliminating any pivotal operation about the unselected axis, whereby selection of pivotal operation about either pivotal axis of the first hinge means or the second hinge means permits accommodation of thin original documents, and whereby selection of pivotal operation about the pivotal axis of the first hinge means coupled with a rocking levered lowering movement of the rigid cover over a thick original document on the platen causes vertical sliding elevation of the support structure, allowing accommodation for thick original documents while still allowing the user to maintain the rigid cover in substantially parallel alignment with the platen surface, thereby providing effective user radiation protection.

2. The cover and original document keep device defined in claim 1, wherein the holding means comprises hook and loop type fasteners, of the kind sold under the trademark "VELCRO".

3. The cover and original document keep device defined in claim 1, wherein the two elongated arms of the L-shaped cover frame are disposed at right angles to each other.

4. The cover and original document keep device defined in claim 1, wherein the L-shaped cover frame is disposed about two perimeter edges of the platen surface, so that the mounted rigid cover completely covers the platen surface.

5. The cover and original document keep device defined in claim 1, wherein the holding means are disposed at the remote ends of the elongated arms of the L-shaped cover frame.

6. The cover and original document keep device defined in claim 1, wherein the rigid cover incorporates a lifting means comprising a downwardly extending member to aid in pivoting the rigid cover about the second hinge means.

7. The cover and original document keep device defined in claim 1, wherein the second hinge means is disposed along the rear perimeter edge of the platen surface.

8. The cover and original document keep device defined in claim 1, wherein the platen surface is at substantially the same level as the surrounding housing structure and wherein the first hinge means is disposed along one of the side edges of the platen surface, allowing the opposite side portion of the platen surface and adjacent housing structure to form a substantially flush surface, whereby pivotal movement of the rigid cover about the first hinge means exposes the platen surface to receive documents of all sizes, allowing portions of the documents to extend beyond the platen surface, being supported by the copying apparatus housing structure.

*9. A cover for copying apparatus having a housing and platen surface, comprising:*

*an L-shaped cover frame comprising two elongated arms, one arm being longitudinally pivotally mounted by a first hinge means to the housing structure, the other arm extending outwardly at an angle therefrom;*

*a rigid cover pivotally mounted by a second hinge means to the outwardly extending arm of the L-shaped cover frame; and*

*holding means for independently and releasably securing the rigid cover to the longitudinally pivotally mounted arm of the L-shaped cover frame and alternatively releasably securing the outwardly extending arm of the L-shaped cover frame to the copying apparatus surface, comprising easily attachable and detachable fasteners, thereby allowing selection of pivotal operation about either pivotal axis of the first hinge means or the second hinge means and eliminating any pivotal operation about the unselected axis.*

*10. The cover defined in claim 9, wherein the holding means comprises hook and loop type fasteners, of the kind sold under the trademark "VELCRO".*

*11. The cover defined in claim 9, wherein the two elongated arms of the L-shaped cover frame are disposed at right angles to each other.*

*12. The cover defined in claim 9, wherein the L-shaped cover frame is disposed about two perimeter edges of the platen surface, so that the mounted rigid cover completely covers the platen surface.*

*13. The cover defined in claim 9, wherein the holding means are disposed at the remote ends of the elongated arms of the L-shaped cover frame.*

*14. The cover defined in claim 9, wherein the rigid cover incorporates a lifting means comprising a downwardly extending member to aid in pivoting the rigid cover about the second hinge means.*

* * * * *